(No Model.)

H. B. FORD.
REFRIGERATOR FOR ICE AND COLD AIR MACHINES.

No. 363,454. Patented May 24, 1887.

WITNESSES:
Gustave Dieterich
C. A. Dieterich

INVENTOR
Henry B. Ford
BY Park Benjamin
his ATTORNEY

UNITED STATES PATENT OFFICE.

HENRY B. FORD, OF NEW YORK, N. Y., ASSIGNOR TO PERKINS & WELSH, OF SAME PLACE.

REFRIGERATOR FOR ICE AND COLD-AIR MACHINES.

SPECIFICATION forming part of Letters Patent No. 363,454, dated May 24, 1887.

Application filed October 13, 1886. Serial No. 216,107. (No model.)

*To all whom it may concern:*

Be it known that I, HENRY B. FORD, of the city, county, and State of New York, have invented a new and useful Improvement in Refrigerators for Ice and Cold-Air Machines, of which the following is a specification.

My invention relates to a refrigerating apparatus for cooling air, which air may subsequently be employed for reducing the temperature in freezing-chambers, cellars, or other localities where a dry atmosphere of low temperature is desired.

My invention consists in a closed chamber containing brine or other suitable non-congealable liquid, adapted also to absorb moisture contained in the air, which air is caused to pass through it. The air is delivered into the brine in a finely-broken-up state, and in rising through said brine becomes dried and cooled. The temperature of the brine is reduced by means of a series of concentric annular vessels placed in it, in which vessels a volatile liquid—such as sulphurous oxide in liquid form—is allowed to expand into gas. During this expansion, as is well known, the heat from the surrounding medium is absorbed.

Figure 1:
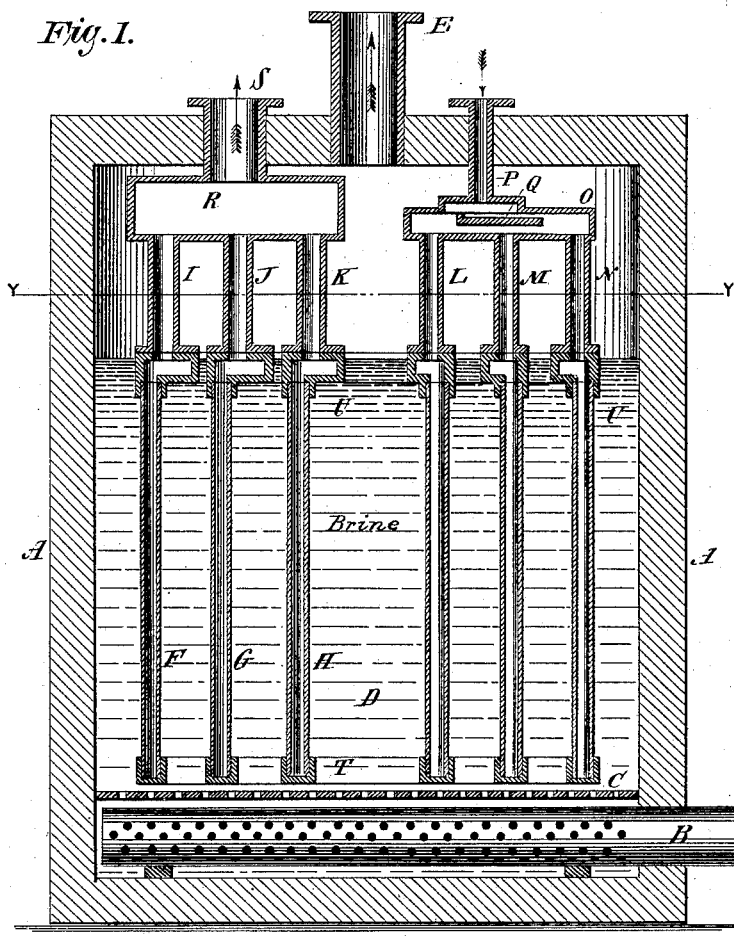
Figure 2:
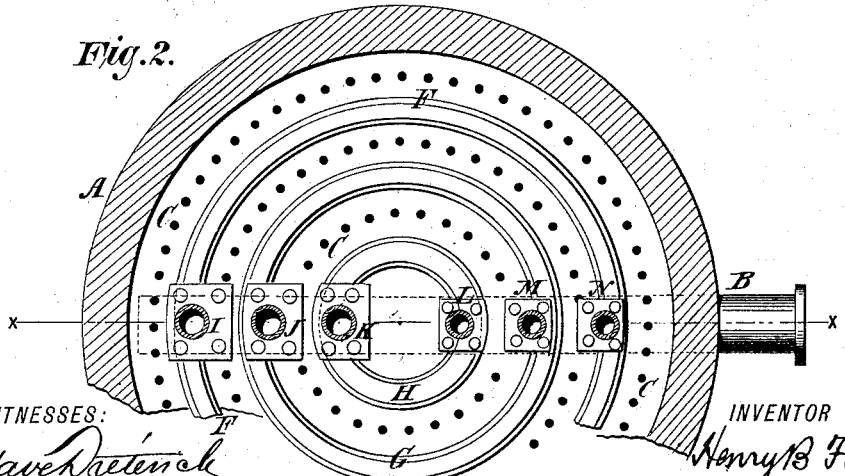

In the accompanying drawings, Figure 1 is a vertical section of my refrigerator on the line $x\ x$ of Fig. 2. Fig. 2 is a horizontal section on the line $y\ y$ of Fig. 1.

Similar letters of reference indicate like parts.

A is the containing-vessel, which may be of any suitable dimensions. Into the lower part of said vessel enters the perforated pipe B. C is a horizontal perforated partition above said pipe. D represents brine or other non-congealable liquid contained in said vessel. In the upper part of said vessel is the air-outlet E.

F, G, and H are three concentric annular vessels, closed at each extremity except where they are entered by the pipes I, J, K, L, M, and N. These vessels F G H are wholly submerged in the brine D, as shown. The pipes L, M, and N communicate with a chamber, O, and into this chamber the entering liquid is led through the pipe P. After the liquid has passed through the pipe P it meets the plate Q, supported within the chamber O. The function of this plate is to spread or diffuse the liquid, so that it may be distributed as uniformly as possible to the three pipes L M N, and hence to the three annular vessels F G H. The pipes I J K communicate with a chamber, R, and from this chamber the gas-outlet S passes through the top of the vessel A.

The annular vessels F G H are provided with annular caps or covers T at their lower extremities and annular caps or covers U U at their upper extremities. The caps U at their points of junction with the tubes I K J L M N are enlarged to form small chambers, for convenience in connecting the said tubes. It will be noticed that the chambers in the caps U which communicate with the pipes I J K are larger than the chambers in said cap which communicate with the pipes L M N, and also that the pipes I J K, chamber R, and outlet-pipe S are larger in size than the pipes L M N, chamber O, and inlet-pipe P. The object of this arrangement is to provide increased space for the largely-augmented volume of the contents of the vessels F G H when said contents are converted from the liquid to the gaseous state.

The operation of my device is as follows: The sulphurous oxide or other liquid to be volatilized enters the apparatus by the pipe P, and after diffusion by the plate Q in the chamber O passes from said chamber through the pipes L M N into the annular vessels F G H. In said vessels the liquid is permitted to expand, and in expanding it absorbs heat from the brine surrounding the vessels F G H, and so greatly reduces the temperature of the brine. Finally, after expansion the gas escapes through the pipes I J K to the chamber R, and thence out of the apparatus by the pipe S. The air to be refrigerated meanwhile enters by the pipe B, and after passing through the perforations in said pipe, and also the perforations in the partition C, it becomes finely broken up and rises upward through the brine in the form of small bubbles, thus becoming cooled by contact with said brine, and also simultaneously dried, and, finally, it escapes from the apparatus by the pipe E.

I claim—

1. The combination, substantially as shown and described, of the vessel A, containing a non-congealable liquid, the perforated air-inlet pipe B, the perforated partition C, arranged above said pipe, the outlet E, the concentric annular vessels F G H, submerged in the liquid in the vessel A, the inlet-chamber for said annular vessels, provided with the distributer-plate Q, and the outlet-chamber R for said annular vessels, of greater area than the inlet-chamber, all constructed and arranged substantially as and for the purpose described.

2. The combination of the vessel A, containing a non-congealable liquid, the annular vessels F G H, submerged in said liquid, inlet and outlet chambers O R, respectively for said annular vessels, arranged above them and connected therewith, respectively, by pipes L M N and I J K, inlet and outlet conduits P S, respectively connected with the inlet and outlet chambers, the air-inlet B, arranged below the liquid in the vessel A, and the air-outlet E, arranged at the top of the said vessel, substantially as described.

HENRY B. FORD.

Witnesses:
JAMES S. GREVES,
PARK BENJAMIN.